United States Patent [19]

Budny

[11] 4,133,458

[45] Jan. 9, 1979

[54] TONER DISPENSER ARRANGEMENT

[75] Inventor: Thomas J. Budny, Ontario, N.Y.

[73] Assignee: Xerox Corporation, Stamford, Conn.

[21] Appl. No.: 793,119

[22] Filed: May 2, 1977

[51] Int. Cl.[2] .......... G01F 11/20

[52] U.S. Cl. .......... 222/228; 118/612; 118/653; 222/238; 222/407; 222/DIG. 1

[58] Field of Search .......... 222/185, 202, 203, 216, 222/228, 238, 406, 407, 414, DIG. 1; 366/271; 118/608, 610, 612, 653

[56] References Cited

U.S. PATENT DOCUMENTS

| | | | |
|---|---|---|---|
| 3,035,740 | 5/1962 | Burch | 222/238 X |
| 3,119,529 | 1/1964 | Maestrelli | 222/202 X |
| 3,622,054 | 11/1971 | Davidson | 222/238 X |
| 3,930,466 | 1/1976 | Stover | 118/653 X |

*Primary Examiner*—Stanley H. Tollberg
*Assistant Examiner*—Fred A. Silverberg

[57] ABSTRACT

A toner dispenser including a substantially enclosed dispensing hopper arranged to support a quantity of finely divided particulate material. The hopper is provided with an opening therein through which the material is dispensed by gravity to a developer sump. A cylindrical dispensing roll is rotatably supported in the hopper in or adjacent the opening with the roll surface in biasing contact with the interior wall surface of the container to form a movable seal for retaining particulate material within the hopper. The roll is formed of a resilient foamed elastomeric material having a textured outer surface with a plurality of open-cell cavities adapted to receive and support toner particles. The dispensing roll is rotated sequentially through the material in the hopper to load the open-celled cavities and then past at least one of the biasing surfaces wherein the surface of the roll is deformed sufficiently to cause toner thereon to be dispensed from the roll surface into the developer chamber. An antibridging apparatus is provided within the dispensing apparatus to maintain the contents of the container in a particulate state to ensure the uniform dispensing thereof, the antibridging apparatus comprising a web-like net mounted for rotation intermediate the roll and the walls of the hopper at the dispensing opening. The net may be driven by the frictional contact with the foam dispensing roll itself.

4 Claims, 2 Drawing Figures

TONER DISPENSER ARRANGEMENT

BACKGROUND OF THE INVENTION

This invention relates to improvements in apparatus for dispensing finely divided powders or granular materials and, in particular, to improvements in xerographic toner dispensing apparatus.

More specifically, this invention relates to a xerographic toner container having dispensing means associated therewith that is particularly adapted for use in conjunction with a xerographic developing apparatus. Basically, in the art of xerography, a plate formed of a photoconductive surface carried on a conductive substrate is uniformly charged and the surface of the plate then exposed to a light image of an original which is to be copied. The photoconductive layer becomes conductive under the influence of the light image to selectively dissipate the charge found thereon thus forming a latent electrostatic image. To make this latent image visible, a finely divided pigmented resin-based material, commonly referred to as toner, is first charged to a potential opposite to that of the latent electrostatic image and then while still in a charged state, brought into contact with the latent image where the charged toner particles are attracted to the image where the charged toner particles are attracted to the image areas. The developer image is usually transferred from the plate surface to a final support material and fixed thereto to form a permanent record of the original.

The resin-based toners employed in the practice of the xerographic process are generally blended from finely sub-divided materials to yield an extremely fine powder composition having an average particle size of about 10 microns. As used in most automatic xerographic reproducing apparatus, the fine toner particles are brought into rubbing contact with a triboelectrically remote and relatively coarser "carrier" material. The rubbing or mixing action causes the toner particles to become triboelectrically charged to a polarity opposite that of the carrier. The charged toner particles electrostatically coat themselves on the surface of the coarser carrier material and remain bonded there in a charged state. The two component material is then brought into contact with an image bearing photoconductive plate by one of several known techniques where the toner is electrostatically transferred from the carrier surface to the latent image areas to effect development. As can be seen, the coarser carrier particles not only provide a means for charging the toner material, but also provide a vehicle by which the toner particles, but also provide a vehicle by which the toner particles are conveniently handled and transported in the xerographic development apparatus.

In order to substain continuous operation in an automatic device, the toner material consumed in the development process must be periodically replaced within the development system. One arrangement for resupplying spent toner involves the use of a sealed toner cartridge or package which is placed into the xerographic machine when toner is depleted. The package usually includes a series of openings which are covered with an easily removable adhesive strip. The strip is removed from the package while maintaining the opening in the package at a 12 o'clock position. The package is then inserted into a receiving portion of the machine generally above the developer sump and rotated to bring the openings to the 6 o'clock position. This dumps the entire contents of the package into a dispensing hopper from whence a controllable amount of toner is periodically added to the development system in accordance with an error signal developed in accordance with well known techniques. The package is left in the machine until a new package is needed to fill the hopper.

Dispensing of toner from the hopper of the above described arrangement may be accomplished by means of a toner dispensing foam roll in accordance with U.S. Pat. No. 3,596,807 or Re. 27,876.

However, it has been found that the apparatus referred to in the above identified patents while solving the problems heretofore associated with the prior art dispensing devices, has not proven entirely satisfactory for dispensing all types of electroscopic toner powder. The minute electroscopic toner powder which is contained in the dispenser, due in part to its electroscopic nature, has a tendency to form a bridge above the dispensing roller. The roller will dispense the toner powder adjacent to its surface but due to the bridging action of the toner powder, once this toner material has been removed the dispenser will cease to function. Therefore, it is necessary for the continuous functioning of the dispensing mechanism to prevent the formation of the toner powder bridge adjacent the dispensing roll to thereby ensure uniform and accurate distribution of the toner powder and continuous movement through the roll.

OBJECTS AND SUMMARY OF THE INVENTION

It is therefore a primary object of this invention to improve apparatus for handling and dispensing of finely divided particulate materials.

A further object of this invention is to improve automatic xerographic development apparatus by minimizing the handling of xerographic toner materials.

Yet another object is to provide a toner dispensing mechanism which inhibits the formation of toner bridges adjacent a dispensing open cell roll to thereby promote a uniform passage of toner when desired.

Yet another object is the provision of a toner dispenser which overcomes the disadvantages attendent to prior art dispensers.

These and other objects of the present invention are attained by means of a substantially enclosed dispensing hopper arranged to support a quantity of finely divided particulate material. The hopper is provided with an opening therein through which the material is dispensed by gravity to a developer sump. A cylindrical dispensing roll is rotatably supported in the hopper in or adjacent the opening with the roll surface in biasing contact with the interior wall surface of the container to form a movable seal for retaining particulate material within the hopper. The roll is formed of a resilient foamed elastomeric material having a textured outer surface with a plurality of open-cell cavities adapted to receive and support toner particles. Means are operatively connected to the dispensing roll to rotate it sequentially through the material in the hopper to load the open-celled cavities and then past at least one of the biasing surfaces wherein the surface of the roll is deformed sufficiently to cause toner thereon to be dispensed from the roll surface into the developer chamber. An anti-bridging apparatus is provided within the dispensing apparatus to maintain the contents of the container in a particulate state to ensure the uniform dispensing thereof, the antibridging apparatus comprising a web-like net mounted for rotation intermediate the roll and the walls of the hopper at the dispensing opening; the net may be driven by the frictional contact with the foam dispensing roll itself.

DESCRIPTION OF THE PREFERRED EMBODIMENTS

Figure 1:
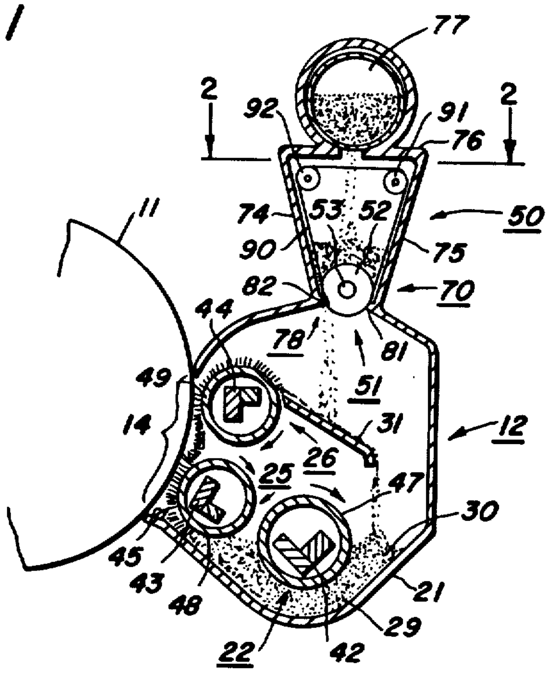
FIG. 1 is an illustrative view of a conventional xerographic development system with the toner dispenser of the invention incorporated therein.

Referring to FIG. 1 the dispenser 50 of the invention is shown for the sake of explanation as part of a conventional development system of the magnetic brush type. The dispenser may, of course, be incorporated into various other development systems well known in the art, as will become readily apparent hereinafter. The development system 12 operates to develop electrostatic latent images carried by an imaging surface 11. The construction of the xerogaphic imaging surface 11 and the remainder of the reproduction machine required to produce xerographic copy are well known in the art and will not be described herein in detail.

For the sake of completeness, a brief description of the representative development arrangement 12 will be given.

As shown, the development system 12 comprises a housing 21 in which is disposed a transport roll assembly 22 and a series of applicator roll assemblies 25 and 26 which cooperate to circulate developer material 30 along a path which runs from a sump 29 in the lower reaches of the housing 21, through a development zone 14, and then back to the sump 29 via return baffle 31. Suitable crossmixing vanes may be formed on the baffle 31 to mix the returning developer. The development zone 14 is located in the space intermediate the imaging surface 11 and the applicator roll assemblies 25 and 26. In keeping with generally accepted practices, the developer material 30 comprises a mixture of triboelectrically charged toner particles and ferromagnetic carrier particles.

More particularly, in operation, developer material 30 is picked up from the sump 29 by transport roll assembly 22 and delivered to the lower applicator roll assembly 25 which advances the developer upwardly between the imaging surface 11 and successive ones of the applicator roll assemblies 25 and 26 through the development zone 14. To that end, the transport roll assembly 22 and the applicator roll assemblies 25 and 26 comprise individual permanent magnets 42–44 which are stationarily supported within separate non-magnetic sleeves 47–49, respectively. The magnets 42–44 and the sleeves 47–49 typically extend across substantially the full width of the development zone 14. Moreover, the sleeves 47–49 are rotatably driven (by means not shown) in the direction indicated by the arrows so that the developer material 30 magnetically entrained thereon under the influence of the magnetic fields provided by the magnets 42–45 is transported, as above described, from the sump 29 to the last or uppermost applicator roll 49. After passing between that roll and the photoconductor 11, the developer is discharged onto the downwardly sloping ramp or baffle 31, which guides it back into the sump 29.

As is usually the case in development systems of this type, the sleeves 47–49 of the applicator roll assemblies are spaced a predetermined short distance from the photoconductor 11, and the magnetic fields emanating from the magnets 42–45 are shaped to cause the developer on the sleeves to form bristle-like stacks or steamers which bridge that space. Hence, the developer brushes against the photoconductor 11 while passing between the photoconductor and each of the sleeves, thereby developing any latent images which happen to be present. Desirably, of course, there is a more or less uniform flow of developer across the full width of the development zone 14. Consequently, in the illustrated embodiment, there is a trimmer bar 45 for leveling the profile of the developer entrained on the sleeve 48.

It is believed that the foregoing description is sufficient for purposes of the present application to show the general operation of the xerographic development apparatus employing a toner container and dispensing apparatus constructed in accordance with the present invention. Although not shown, suitable drive means are also provided to drive the imaging surface and other operating mechanisms at predetermined speeds relative to each other for proper machine operation. For further details concerning specific construction of the xerographic apparatus of the type shown herein, reference is had to U.S. Pat. Nos. 3,301,126 and 3,948,217.

In connection with the function and manner of operation of the toner dispensing unit herein disclosed, it is deemed desirable at this point to briefly discuss the problems and terms related to the handling and dispensing of fine particulate material. As previously noted, because of its nature, finely divided material is extremely difficult to handle and uniformly dispense. Another characteristic associated with toner particles used in xerographic applications is its tendency under certain humidity and temperature conditions to agglomerate or pack together so tightly that they will literally become a solid mass. The agglomeration of powder particles may also be effected as a result of cold flow, that is although the particles may not be at a sufficiently high temperature, the material may be viscous enough to cause the particles to weakly adhere to each other. In any event, toner material supported within a container as therein disclosed is capable of blocking or forming bridges therein which will impede the normal downward flow of material.

Figure 2:
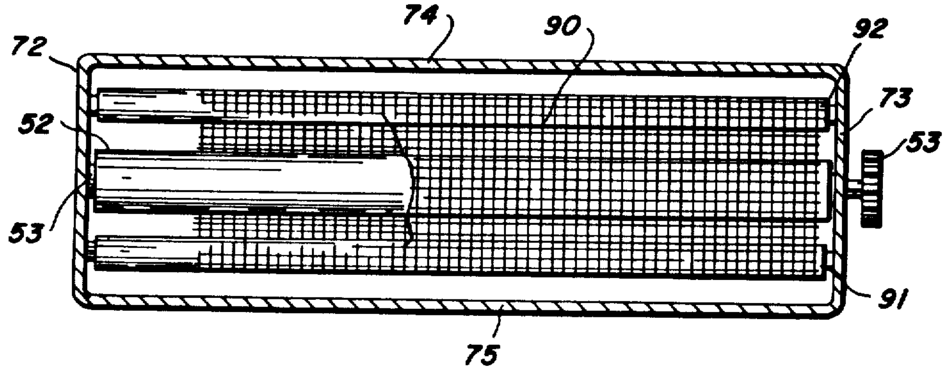
FIG. 2 is a plan view partly in section of the dispenser along the line 2—2 of FIG. 1.

Referring to FIGS. 1 and 2, the toner dispensing unit 50 of the present invention includes a hopper 70 formed integrally with the developer housing walls. The hopper is constructed of two-substantially parallel end walls 72 and 73 and two sidewalls 74 and 75. The hopper 70 has a top wall 76 which is formed into a substantially hollow cylindrical toner cartridge receiver 77. The receiver 71 is formed to house a cartridge of the type disclosed in U.S. Pat. Nos. 3,389,807 or 3,356,248, which cartridge operates to resupply a batch of toner to the hopper 70 when needed, in a well known manner.

The bottom portions of the sidewalls 74 and 75 are spaced apart to form a dispensing opening 78 in the bottom of the hopper. The inclined surfaces of the sidewalls function to direct toner in the hopper toward the dispensing opening 78.

The hopper while disclosed as being formed integrally with the developer sump housing may be formed separated and attached in the position shown. If formed separately, it may be made of a rigid molded thermoplastic material. Typical resin-based materials frm which this type of hopper can be molded are polypropylenes, polyethylenes, chlorinated polyethers, acrylonitrile butadine styrene, polystyrene, acetates, fluorocarbons, and methyl methacrylate. Care should be taken however to select the thermoplastic materials which are chemically inert in respect to the composition of the particulate material supported therein.

The dispensing apparatus 50 further includes a dispensing roll assembly 51 constructed in accordance with the teachings of U.S. Pat. No. 3,596,807. The roll assembly 51 includes a cover 52 securely affixed to a shaft 53, as for example, by gluing and the shaft journaled for rotation in bearing blocks (not shown) provided in the lower end walls 72 and 73 of the hopper 70. One end of shaft 52 extends through the end walls of the hopper for coupling to a suitable drive means to rotate the shaft. The dispensing cover may be formed from any number of foamed elastomeric materials having a textured open-celled surface structure made up of a mass of small hollow cavities capable of receiving and supporting a quantity of particulate material therein. Typical examples of foamable materials that can be formed in open-celled configurations are polyurethanes, polyvinyl chloride, silicones, polystyrenes, styrene acrylonitrile, cellulose acetate, and phenolics. Foaming of these materials can be accomplished either by mechanical frothing, physically dissolving a gas or liquid within the resin material, or chemically incorporating a foaming or blowing agent directly into the material which is capable of releasing an inert gas within the resin when the temperature is increased. A typical cover for use in this preferred embodiment of the present invention is one fabricated of a urethane foam.

The sidewalls 74 and 75 of the hopper 70 form two flanges or bosses 81 and 82 around the roll to insure uniform toner dispensing across the width of the developer housing. The trimmer boss 81 ensures that each pore of the foam roll cover is filled during its rotation through the toner but does not allow excess toner to pass into the housing. The dispensing boss 82 applies pressure to the cover forcing the dry ink to leave the roll and fall by gravity into the developer sump. The operation of the bosses 81 and 82 in deforming the surface of the roll cover to load and unload toner is described in greater detail in the aforementioned patents.

In order to prevent bridging or agglomeration of toner in the hopper 70 there is provided a coarse mesh net 90. The net 90 is in the form of an endless web which is supported jointly by idler rollers 91 and 92 and the roll assembly 51. The mesh size of the net 90 is selected to be sufficiently large so that toner supplied by the cartridge may easily enter the hopper 70 through the top wall and further that the dispensing roll 51 operates substantially unimpeded in dispensing toner. The net 90 is rotated by frictional contact with the dispensing roll cover 52 and passes through the dispensing opening 78 intermediate the roll cover 52 and the lowermost portions of the sidewalls 74 and 75. The idler rollers 91 and 92 are located so that the net scrapes or moves closely adjacent the converging sidewalls 74 and 75. The rate at which toner is dispensed through the opening 78 may be controlled by selecting the mesh size of the net.

The net may be constructed of nylon but various other fibers or plastic materials would perform satisfactorily.

In operation, as the foam roll 51 is rotated, the toner in the hopper 70 is continuously loaded into the pores of the cover 51 on the hopper side of the roll and forced to be expelled by baffle 82 on the developer sump side of the roll. The net 90 is rotated continuously with the foam roll and continuously breaks up or agitates the toner adjacent the sidewalls 74 and 75 of the hopper and adjacent the narrow gaps between the rolls cover 52 and the sidewalls. This agitation either prevents agglomeration or breaks up the bridges temporarily formed. The mesh is sufficiently large to allow the action of the foam roll cover in loading and dispensing toner to go on substantially unimpeded.

While the preferred embodiment of the invention utilizes a foam dispensing roll any suitable dispensing roller may be employed with the anti-bridging net of the invention.

What is claimed is:

1. Apparatus for dispensing a controlled amount of particulate material comprising a housing for containing said material including wall means defining an elongated dispensing opening, a roll disposed in said opening, means for rotating said roll, said roll operative when stationary to block the passage of material through said opening, and operative when rotating, to dispense said material through said opening, and a foraminous endless web at least partly wound around the periphery of said roll and rotatable in unison therewith, wherein said web is carried jointly by said roll and another roll supported in said hopper and said web is rotated by friction contact with said roll.

2. The combination recited in claim 1 wherein said roll comprises an open-cell resilient material.

3. The combination recited in claim 1 wherein the said net has openings sufficiently large to permit the dispensing of toner by said roll to take place substantially unimpeded.

4. The combination recited in claim 3 wherein said roll comprises an open-cell resilient material.

* * * * *